Figure 2:
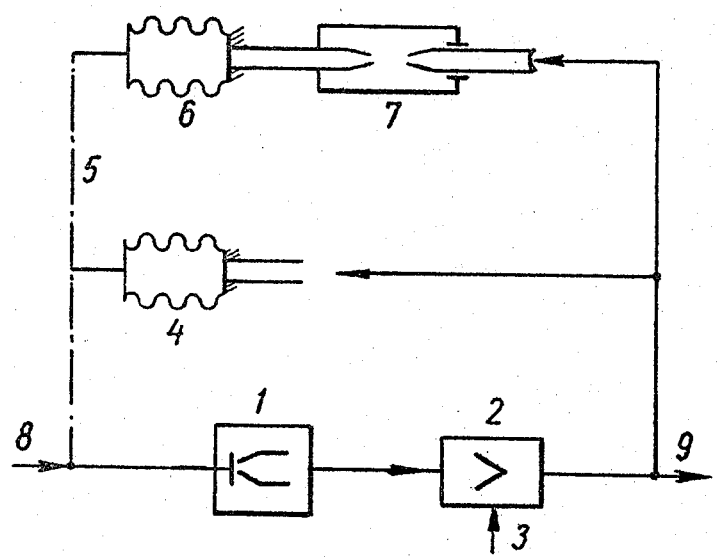

United States Patent Office 3,382,884
Patented May 14, 1968

3,382,884
PNEUMATIC COMPENSATOR
Victor Vasiljevich Kerbunov, Moscow, U.S.S.R., assignor to Nauchno-Issledovatelsky Institute Teploenergeticheskogo priborostroenija, Moscow, U.S.S.R.
Filed Dec. 29, 1964, Ser. No. 421,824
3 Claims. (Cl. 137—86)

This invention relates to compensators for pneumatic systems adapted to control mechanical, heat-power and other parameters, the variation of which can be defined by pressure differential, and more particularly to pneumatic compensators wherein the variation of the parameter forces to be controlled is balanced by the power action of the feedback element.

The readjustment of like devices is usually performed by varying the transfer ratio of the mechanisms, such as those comprising lever mechanisms connecting the sensitive element of the compensator with the feedback element. The devices constituting such mechanisms are rather complicated and unreliable in operation.

Attempts have been made to effect the readjustment of instruments by changing the transfer ratio according to the pressure in the pneumatic feedback line with the aid of throttling devices. The devices of this kind, however, either do not provide for readjustment, are complicated and unreliable in operation, or do not ensure the desired linear relation between the variation of the power action of the controllable parameter and the output signal of the pneumatic compensator. In fact, with the variation of the transmission factor in the back pressure line, the conditions of air flow through the balance indicator (null-indicator), made for instance, as a nozzle-choke unit, of the metering system, change as well.

The sensitivity and stability of the measuring system being at the same time greatly variable, the range of possible readjustment is, consequently, limited. Moreover, the operating point of the balance indicator shifts from the optimum zone into a zone wherein an essential unlinearity of the compensator operation occurs.

According to the above, an object of the present invention is to provide a pneumatic compensator of a simple and reliable design wherein the readjustment of the compensator in the wide range of measurements would be provided with the maintaining of the output signal linear depending upon the value of the parameters to be controlled.

A further object of the invention is to provide a pneumatic compensator feedback system with a non-lever device for the adjustment of the transmission factor to pressure an enabling a wide-range variation of the transmission factor with the preservation of linear relationship between the input and output signals of the compensator.

For the accomplishment of such further object the pneumatic compensator is provided with an auxiliary feedback element in parallel to the main feedback element and having a linear attenuator series-connected thereto. The adjustment of the transmission factor of the attenuator will bring about the adjustment of the compensator proper.

To increase the range of the compensator adjustment, the auxiliary and the main feedback elements can be so arranged that their forces will counteract each other in one and the same direction.

The jet divider with mavoble nozzles positioned along one line is used as a linear attenuator of the proposed compensator.

Figure 1:
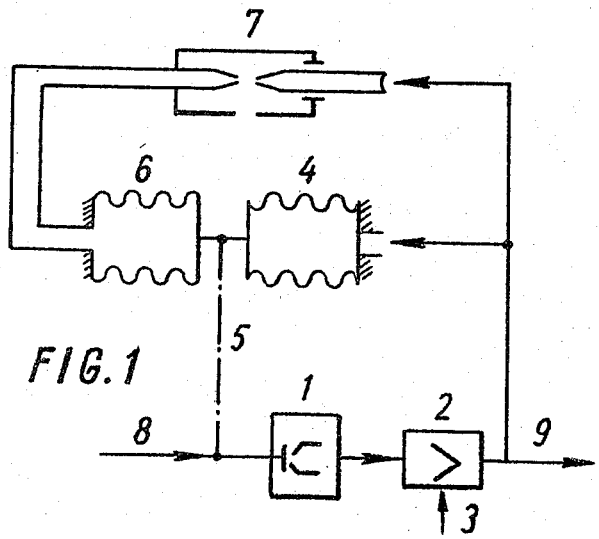
Figure 3:
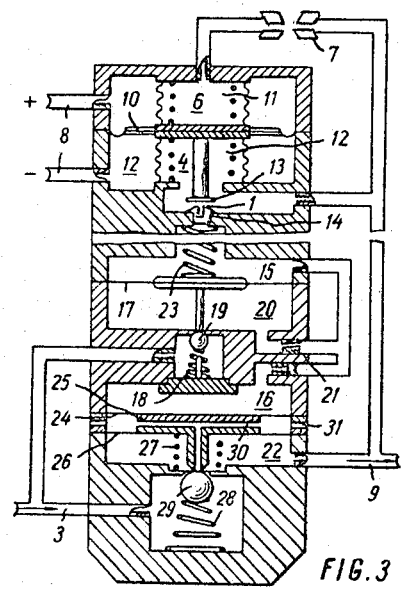
Figure 4:
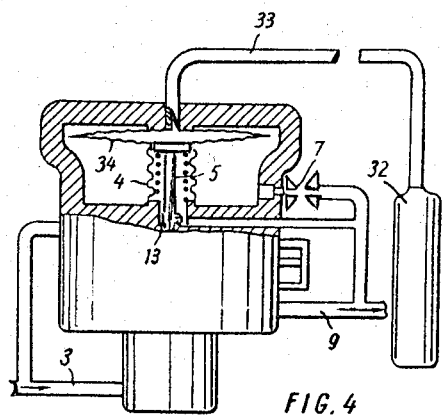
Figure 5:
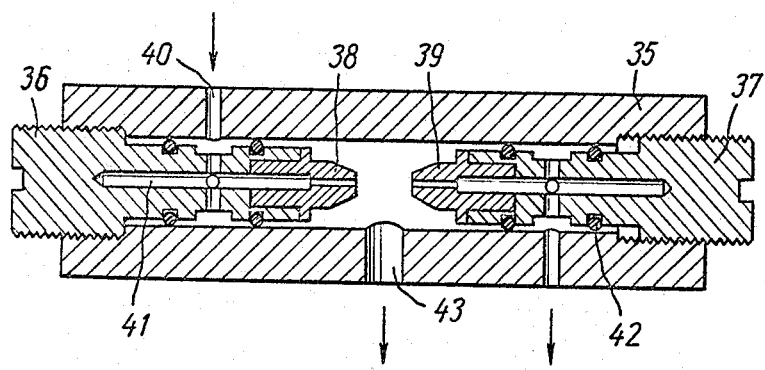

Further objects and advantages of the invention will become more readily apparent to persons skilled in the art from the following detailed description and annexed drawings and in which drawings:

FIG. 1 is a diagrammatic view of a pneumatic compensator wherein the operating forces of auxiliary and main feedback elements are directed counter to each other, FIG. 2 is a diagrammatic view of an embodiment of the pneumatic compensator wherein the main and auxiliary feedback elements operate in the same direction, FIG. 3 is a sectional view of a device made according to FIG. 1 employing a bellows-type pressure differential gauge, FIG. 4 is a sectional view of a device employing the arrangement in FIG. 2, and FIG. 5 is a sectional view of a device provided with adjustable nozzles mounted in the auxiliary feedback line.

The pneumatic compensator is made according to the compensating (self-balancing) diagram (FIG. 1) and consists of null-indicator unit or balance indicator 1, a pneumatic amplifier 2 receiving pressure from a supply source through line 3, and a sensing feedback element 4 mechanically connected to the null-indicator 1 by link 5.

Auxiliary feedback element 6 is connected in parallel to the main feedback element 4 and is supplied with pressure from the output of the pneumatic amplifier 2. Auxiliary feedback element 6 acts upon the link 5 in a direction opposite to that of the main feedback element 4.

The auxiliary back pressure line is provided with linear jet attenuator 7 connected in series to the auxiliary feedback element 6, and includes two coaxial nozzles. The correlation of pressures at the output of the amplifier 2 and main feedback element 4 can be adjusted by varying the distance between the two nozzles, thus making it possible to adjust the pneumatic system as well.

The actuating force of the controllable parameter applied along a line 8, being measured and realized directly on the sensing element of the first converter, acts upon the null-indicator 1, the unbalance signal from which causes, through the amplifier 2, a corresponding variation of the back pressure and as a result of which the power action of the parameter being controlled along line 8 will be balanced by the pressure differential forces of main and auxiliary feedback elements 4 and 6. Simultaneously, at the output of the amplifier 2 and in the main feedback element 4 the pressure is set whose value is characteristic of the controllable action along line 8 and is the compensator output signal taken off the line 9.

The resultant force of feedback elements 4 and 6 depends upon the adjustment of the attenuator 7. Hence, it becomes possible by means of adjustment control to change widely the limits of maximum tolerable forces along the line 8 and thereby change the scope of range values of the parameter being controlled.

The main 4 and auxiliary 6 feedback elements can be so arranged that their action will affect the link 5 in the same direction (FIG. 2). The arrangement of this type makes it possible to measure greater values of forces acting along the line 8 than that shown in FIG. 1.

The bellows-type pneumatic differential pressure gauge (FIG. 3), made according to the arrangement shown in FIG. 1 comprises a diaphragm 10 which, due to the pressure differential in chambers 11 and 12, displaces a control choke 13 of the null-indicator 1.

When choke 13 closes nozzle 14 of the null-indicator, the pressure in chambers 15 and 16 becomes higher. In chamber 15 this higher pressure acts upon a diaphragm 17 which, upon overcoming the resistance of a spring 18, partially opens ball valve 19, thus increasing the pressure in chamber 20.

The constant pressure differential is kept at a level by means of a throttle 21 and, as a result, the pressure in chamber 22 will be kept higher than that in chamber 15 by the value equal to the ratio of the reactive force of spring 23 and operating area of the diaphragm 17.

The elevated pressure in chamber 16 acts upon a diaphragm 24 connected by means of a pressure reducing valve 25 with a diaphragm 26, thus providing for their common travel whereby springs 27 and 28 can be compressed forcing ball valve 29 to open, which, in turn, brings an increase of pressure in chamber 22 communicating with inner spaces of bellows 4 and 6 (feedback elements) and through outlet pipe 9 with the secondary devices.

The pressure in chamber 22 serving as the back pressure and simultaneously as the output signal is delivered through linear attenuator 7 to the space of the bellows 6. The total force applied to the bellows 4 and 6 by means of their feedback pressure, tends to move the choke 13 away from nozzle 14 and return the system to the state of equilibrium.

The value of the pressure differential under measurement in the chambers 11 and 12 being reduced, the choke 13 moves away from nozzle 14 thus bringing about a reduction of pressure in chambers 15 and 16.

Valves 19 and 29 remain closed with the reduction of pressure in chamber 16. The pressure reducing valve 25 of the diaphragms 24 and 26 moves upwardly under the action of spring 27 enabling the air to escape from chamber 22 through passages in pressure reducing valve 25, space 30 between diaphragms 24 and 26 and orifice 31 into the ambient air, thereby causing the reduction of the back pressure as well as the balancing of the measuring system.

The adjustment of the compensator to a desired range of measurements is performed by changing the transmission factor of attenuator 7 placed in the secondary feedback line.

In the vapor-pressure thermometer (FIG. 4) employing the arrangement shown in FIG. 2, the sensing element is a vapor-liquid system comprising a temperature bulb 32, capillary 33 and a diaphragm set 34. The set 34 serves as an auxiliary feedback element of this device.

Adjustable jet attenuator 7 (FIG. 5) is provided with a sleeve 35 provided with threaded plugs 36 and 37 threaded into the respective ends thereof. Nozzles 38 and 39 are mounted on the inner ends of threaded plugs 36 and 37. The sleeve and threaded plugs are provided with passages 40 and 41 respectively for the delivery of pressure.

For the purpose of sealing the device, two pairs of gaskets or rings 42 are placed between the plugs 36 and 37 and the inner surface of the sleeve 35. Orifice 43 of sleeve 35 communicates with the atmosphere. The adjustment of the pneumatic system can be effected by varying the interval or gap between the ends of nozzles 38 and 39 by proper manipulation of the plugs 36 and 37.

The invention is not to be confined to any strict conformity to the showings in the drawings but changes or modifications may be made therein so long as such changes or modifications mark no material departure from the spirit and scope of the appended claims.

What is claimed is:

1. A pneumatic compensator comprising: a sensitive element capable of transforming an action of a parameter being controlled in to a force; a null-indicator having a movable element rigidly connected with said sensitive element; a stationary nozzle relative to which said movable element travels thus causing a variation of pressure in the passage of said nozzle; a pneumatic amplifier for a pressure signal developing in the passage of said nozzle during the travel of said movable element; said pneumatic amplifier having an output; a compressed air supply source connected to said pneumatic amplifier; main feedback means receiving pressure from the output of said pneumatic amplifier and acting upon said sensitive element; auxiliary feedback means connected to the output of said pneumatic amplifier in parallel to said main feedback means and also acting upon said elastic sensitive element; two nozzles series connected to said auxiliary feedback means in connection between the auxiliary feedback means and the output of the pneumatic amplifier; said two nozzles being mounted co-axially one opposite the other with a gap therebetween; means for venting the gap to atmosphere; and means to adjust said gap between said nozzles whereby balancing of the pneumatic compensator is effected.

2. A pneumatic compensator comprising: a sensitive element responding to variations of parameter being controlled; a movable choke rigidly connected to said sensitive element; a nozzle capable of being closed by said movable choke thereby causing a variation of pressure in the passage of said nozzle; a pneumatic amplifier for a pressure signal developing in the passage of said nozzle with the choke set in motion; said pneumatic amplifier having an output; a compressed air supply source connected to said pneumatic amplifier; a main feedback elastic element receiving pressure from the output of said pneumatic amplifier and acting upon said sensitive element; an auxiliary feedback elastic element connected in parallel to said main feedback element and acting upon said sensitive element in a direction coinciding with that of the action of said main feedback element; a line connecting the output of said pneumatic amplifier with said auxiliary feedback element; two nozzles series-connected to the auxiliary feedback element in said line connecting said output and auxiliary feedback element; said two nozzles being mounted co-axially one opposite the other with a gap therebetween; means for venting the gap to atmosphere; and means to adjust said gap between said nozzles due to which the balancing of pneumatic compensator is effected.

3. A pneumatic compensator comprising: an elastic sensitive diaphragm responding to variations of a parameter being controlled; a movable choke rigidly connected to said elastic sensitive diaphragm; a nozzle capable of being closed by said movable choke; a pneumatic amplifier for a pressure signal appearing in the passage of said nozzle during the travel of said choke; a compressed air supply source connected to said pneumatic amplifier; said pneumatic amplifier having an output; a main feedback elastic bellows receiving pressure from the output of said pneumatic amplifier and acting upon said elastic diaphragm; an auxiliary feedback bellows connected in parallel to said main feedback bellows and acting upon said elastic diaphragm in a direction opposite to that of the action of main feedback bellows; a line connecting the output of said pneumatic amplifier with said auxiliary feedback bellows; two nozzles connected in series to the auxiliary feedback bellows in said line connecting said output with said auxiliary feedback bellows; said two nozzles being mounted co-axially one opposite the other with a gap therebetween; means for venting the gap to atmosphere; and a screw mechanism serving to adjust the gap between said nozzles.

References Cited
UNITED STATES PATENTS

| | | | |
|---|---|---|---|
| 2,896,655 | 7/1959 | Hartz | 137—86 |
| 3,098,498 | 7/1963 | Brewer | 137—86 |

ALAN COHAN, *Primary Examiner.*